United States Patent [19]
Molnar et al.

[11] Patent Number: 5,111,421
[45] Date of Patent: May 5, 1992

[54] SYSTEM FOR PERFORMING ADDITION AND SUBTRACTION OF SIGNED MAGNITUDE FLOATING POINT BINARY NUMBERS

[75] Inventors: Karl J. Molnar, Clifton Park; Ho Chung-Yih, Schenectady; Daniel A. Staver, Scotia; Barbara D. Molnar, Clifton Park, all of N.Y.

[73] Assignee: General Electric Company, Schenectady, N.Y.

[21] Appl. No.: 484,752

[22] Filed: Feb. 26, 1990

[51] Int. Cl.⁵ .............................................. G06F 7/38
[52] U.S. Cl. ............................................. 364/748
[58] Field of Search ..................................... 364/748

[56] References Cited

U.S. PATENT DOCUMENTS

| | | | |
|---|---|---|---|
| 4,562,553 | 12/1985 | Matted et al. | 364/748 |
| 4,592,006 | 5/1986 | Hagiwara et al. | 364/748 |
| 4,644,490 | 2/1987 | Kobayashi et al. | 364/748 |
| 4,839,846 | 6/1989 | Hirose et al. | 364/748 |
| 4,841,467 | 6/1989 | Ho et al. | 364/748 |
| 4,866,651 | 9/1989 | Blehr et al. | 364/748 |
| 4,896,286 | 1/1990 | Ueda | 364/748 |
| 4,901,267 | 2/1990 | Burman et al. | 364/748 |
| 4,994,996 | 2/1991 | Fossum et al. | 364/748 |

OTHER PUBLICATIONS

Van Shahan, "The MC68881: The IEEE Floating Point Standard Reduced to One VLSI Chip"-*Proc. Compcon Spring 84* pp. 172-176.

W. A. Geideman, Jr., "High-Speed Gallium Arsenide Microprocessor", Final Technical Report for Phase 1 of Contract No. 84F134300 by McDonnell Douglas Astronautics Company, Sep. 1985, Section 4, Floating Point Coprocessor.

*Primary Examiner*—Dale M. Shaw
*Attorney, Agent, or Firm*—Marvin Snyder; James C. Davis, Jr.

[57] ABSTRACT

A versatile floating point adder which performs high speed floating point addition or subtraction on operands supplied in a signed magnitude format includes separate exponent and mantissa data paths for processing the exponent fields and mantissa fields of the floating point binary numbers to be added or subtracted. The exponent data path computes the absolute difference between the exponents of the floating point numbers, passes the large exponent, and adjusts the large exponent by an amount needed to normalize the mantissa and to reflect an overflow in the mantissa addition/substration and mantissa rounding operations. The mantissa data path denormalizes one of the input mantissas, adds the two mantissas after the denormalization operation, post-normalizes the resulting mantissa, and rounds the mantissa to the correct precision.

11 Claims, 4 Drawing Sheets

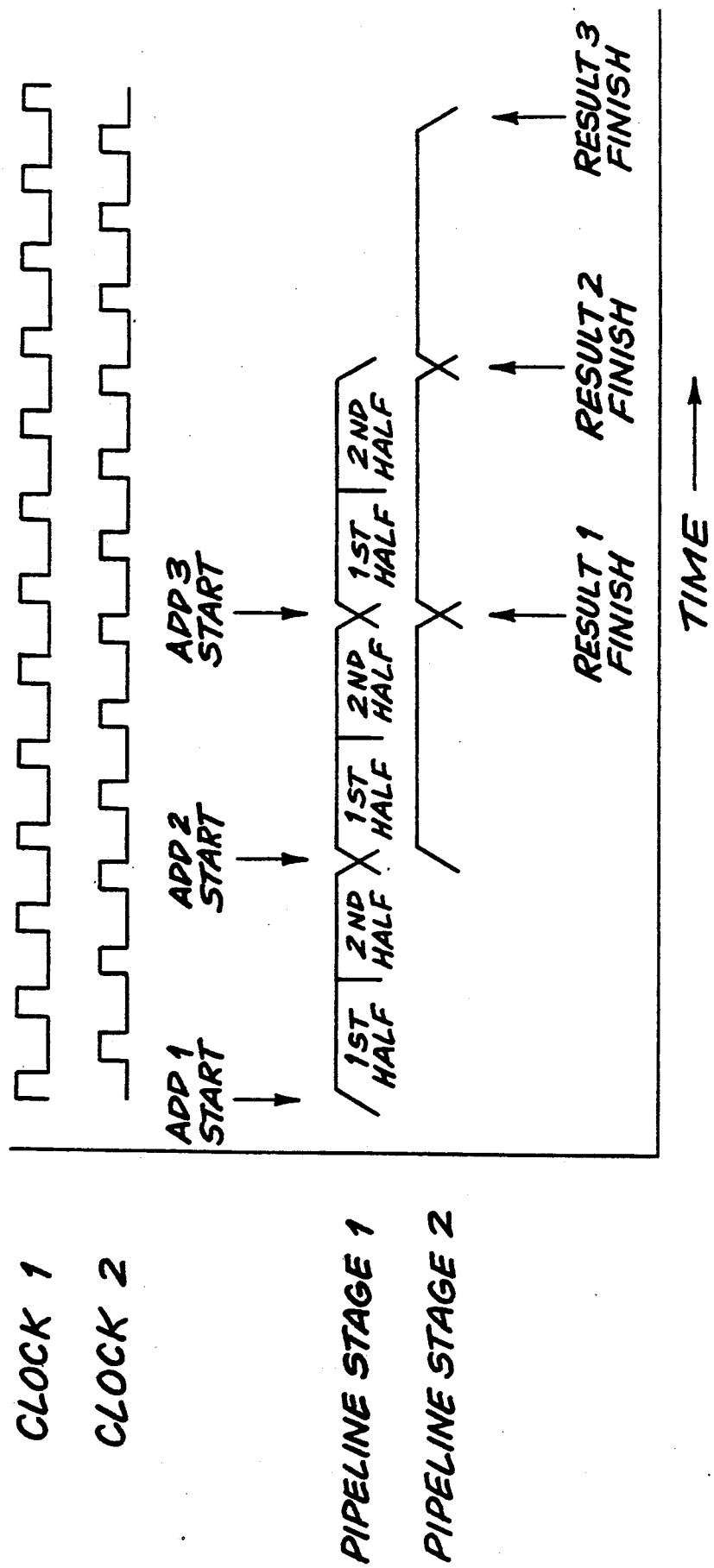

SYSTEM FOR PERFORMING ADDITION AND SUBTRACTION OF SIGNED MAGNITUDE FLOATING POINT BINARY NUMBERS

This invention was made with Government support under contract 85F097700 awarded by the U.S. Department of Defense. The Government has certain rights in this invention.

BACKGROUND OF THE INVENTION

1. Field of the Invention

This invention relates generally to a signed magnitude floating point addition and subtraction system and, more particularly, to a versatile floating point adder which performs high speed floating point addition and subtraction in a signed magnitude format.

2. Description of the Prior Art

The signed magnitude data format consists of an exponent field, a mantissa field, and a sign bit field used to represent floating point binary numbers. A floating point binary number N can be represented as:

$$N = (-1)^S \times 2^{E-b} \times (1.F)$$

where S is the sign field, E is the exponent field, F is the fraction or mantissa field, and b is a bias.

In floating point addition and/or subtraction operations, the following basic eight steps are performed sequentially to actually execute the addition or subtraction operation.

(1) The two exponent fields of the floating point numbers are compared to determine an exponent difference.

(2) The fractional part (mantissa) of the floating point number having the smaller exponent is "denormalized" i.e., the specified mantissa is shifted so as to produce floating point numbers having the same exponent.

(3) The denormalized mantissa is added to or subtracted from the mantissa with the larger exponent or vice versa, depending upon the signs of the operands.

(4) The sign of the result is determined.

(5) The result is converted into a signed magnitude representation.

(6) The number of leading zeros of the result is determined. It is important to realize that leading zeros can result from addition and/or subtraction operations in which the high order bits cancel one another.

(7) The result is normalized, and correspondingly the resulting exponent is adjusted in concert with the normalization performed for the fractional part of the result.

(8) The mantissa is rounded, and the exponent is incremented by 1 if a rounding overflow occurs.

In high speed computation oriented systems, the speed of multiplying floating point binary numbers approaches the speed of addition. In previous pipelined multiply/accumulate architectures, the time required for adding or subtracting floating point binary numbers has been significantly less than the time required for multiplication.

In the conventional design known as the floating point "multiply/accumulate design", the architecture is designed to handle mantissa addition in a two's complement format. This architecture requires conversion of the input mantissa from a signed magnitude format into a two's complement format so that subtraction can be performed. Special hardware is required to perform this conversion function. In this same design it is necessary to convert the final floating point mantissa result from the two's complement format into signed magnitude format. In this case the mantissa data is simply inverted to perform the conversion, which reduces accuracy in the final mantissa result. The final result does not require any additional two's complement hardware to perform this conversion and preserves computation speed, at the cost of losing one bit of accuracy in the final result. Accordingly, either less speed, additional hardware, or reduced accuracy of result is a penalty encountered when floating-point subtraction is to be performed using two's complement format internal to the architecture and signed magnitude format external to the architecture.

As indicated in the previous paragraph, the conventional "multiply/accumulate" chip converts the single precision input signed magnitude format into a two's complement format in order to perform both addition and subtraction operations. This does not satisfy the need for double precision computations in a floating point architecture in which the addition/subtraction computations are performed at the same speed as multiplication computations and all operations are performed on double precision data. Thus, a more versatile design is required to meet this need.

SUMMARY OF THE INVENTION

It is therefore an object of the present invention to provide a versatile floating point adder which efficiently performs the operations of both addition and subtraction in a signed magnitude format.

It is another object of the invention to provide a versatile architecture for floating point binary adders which performs both addition and subtraction of floating point data in a signed magnitude format without converting the mantissa data into a two's complement format.

Briefly, in accordance with a preferred embodiment of the invention, a signed magnitude floating point addition and subtraction system includes separate exponent and mantissa data paths for processing floating point binary numbers to be added or subtracted. The exponent data path is responsive to the exponent fields of the floating point binary numbers for selecting the larger of the two exponent fields. The positive difference between the exponent fields is also determined. The mantissa data path is responsive to the mantissa fields of the floating point binary numbers for determining the sum of or the difference between the mantissa fields, and for determining an addition overflow. If necessary, one of the mantissa fields is denormalized in the mantissa data path by right-shifting the mantissa field by an amount equal to the positive difference between the exponent fields prior to the determination of the sum of or difference between the mantissa fields.

In the exponent data path, the larger of the two exponent fields is incremented by the values one and two. Then the exponent field incremented by one is selected if no mantissa addition overflow occurs, or the exponent field incremented by two is selected if a mantissa addition overflow occurs. A separate pipeline register in each path stores the incremented exponent field and the sum of or the difference between the mantissa fields.

In the mantissa data path, the sum of or the difference between the mantissa fields stored in the pipeline register is right-shifted by one if an addition overflow occurs. Also, the number (LZE) of leading zeros of the sum of or the difference between the mantissa fields stored in the pipeline register is determined. The sum of or the difference between the mantissa fields stored in the pipeline register is left-shifted by the amount LZE if no addition overflow occurs. The mantissa data path performs a rounding operation on the right-shifted or left-shifted sum or difference of the mantissa fields if necessary to provide a result mantissa. In the exponent data path, the values LZE and LZE-1 are subtracted from the selected exponent field stored in the pipeline register. The exponent data path selects the value of the exponent field less LZE if no rounding overflow occurs and selects the value of the exponent field less LZE-1 if a rounding overflow occurs, to provide a result exponent.

In the exponent data path, the pre-adjustment of the exponent field by incrementing by one and two and the subsequent correction of the exponent field by subtraction of the values LZE and LZE-1 enable the result exponent to be determined by using the addition overflow and rounding overflow signals from the mantissa data path. These operations are performed in parallel to enable the exponent adjustment computations to be rapidly and efficiently accomplished.

BRIEF DESCRIPTION OF THE DRAWINGS

The foregoing and other objects, aspects and advantages will be better understood from the following detailed description of a preferred embodiment of the invention with reference to the drawings, in which:

FIG. 5 is a timing diagram to aid in describing operation of the exponent and mantissa data paths of FIGS. 4 and 5.

DETAILED DESCRIPTION OF A PREFERRED EMBODIMENT OF THE INVENTION

Figure 1:
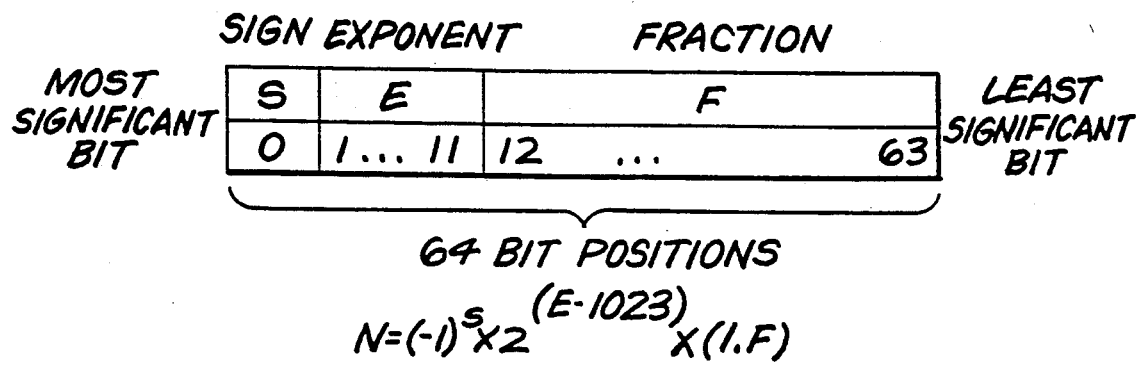
FIG. 1 is a format diagram illustrating a standard signed magnitude representation for a 64-bit floating point number showing its sign, exponent and mantissa fields.

FIG. 1 illustrates the format of the floating point numbers accepted as input signals to the addition/subtraction circuitry of the present invention. In particular, the numbers to be added or subtracted are in signed magnitude form. The example used in FIG. 1 illustrates a 64-bit floating point number. The 64 bits lie in bit positions labeled 0 through 63. In particular, the leftmost bit position (bit position 0) is occupied by the sign bit. While either of two possibilities for sign representation may be employed, it is preferred herein that the signed magnitude representation conform to accepted standards for floating point numbers. The standard shown in FIG. 1 is a subset of the standard IEEE-754 format for double precision floating point numbers. In particular, it will be assumed herein that a sign bit which is 0 represents a positive number, while a sign bit of 1 indicates a negative number.

In the representation shown in FIG. 1, eleven bits are allotted to an exponent field. The exponent field thus occupies bit positions 1 through 11 inclusive, as shown. In accordance with various embodiments of the present invention, the exponent representation may, in general, comprise a number of different schema. However, with eleven bits allotted to the exponent, it is possible to represent $2^{11}$ or 2048 different exponent values (the exponent being a power of 2, not a power of 10). In preferred embodiments of the present invention, the aforementioned standard format is adhered to and, accordingly, the exponent field used in the representation is 1023 higher than its actual value. This to be stored readily. Accordingly, to determine the actual exponent, the number 1023 (which is 01111111111 in binary form) is subtracted from the binary number appearing in the exponent field of the floating point representation.

The fractional or mantissa portion of the number is stored in bit positions 12 through 63 of the representation shown in FIG. 1. This fraction always represents a magnitude. It is assumed that the binary point and a leading binary digit 1, not stored or represented in FIG. 1, are present to the left of the leftmost fractional bit position. Thus, as indicated in FIG. 1, 52 bits are associated with the fractional part of the floating point number. The above discussions with respect to number representation may be summarized by stating that the sign bit S, the exponent E and the fraction F represent the number N where $$N = (-1)^S \times 2^{(E-1023)} \times (1.F).$$

In the present system, a zero value is indicated by a zero exponent field. It should be appreciated, though, that the specific format shown in FIG. 1 is only one of many possible sign magnitude representations that may be exploited in accordance with the present invention. In particular, the present invention is not specifically limited to utilization of a 64-bit field, nor is there any limitation with respect to positioning of these fields. That is, it is equally possible, in keeping with the present invention, that the fraction field occupy the leftmost bit positions. Moreover, exemplary embodiments presented herein are specifically addressed to the construction of a double precision, floating, addition/subtraction circuit, disposed on a single integrated circuit chip, and capable of operating at a 40 megahertz clock rate. While some variation in design details will occur for other formats and other field sizes, such variations are well within the skill of the ordinary practitioner of the logic design arts.

Figure 2:
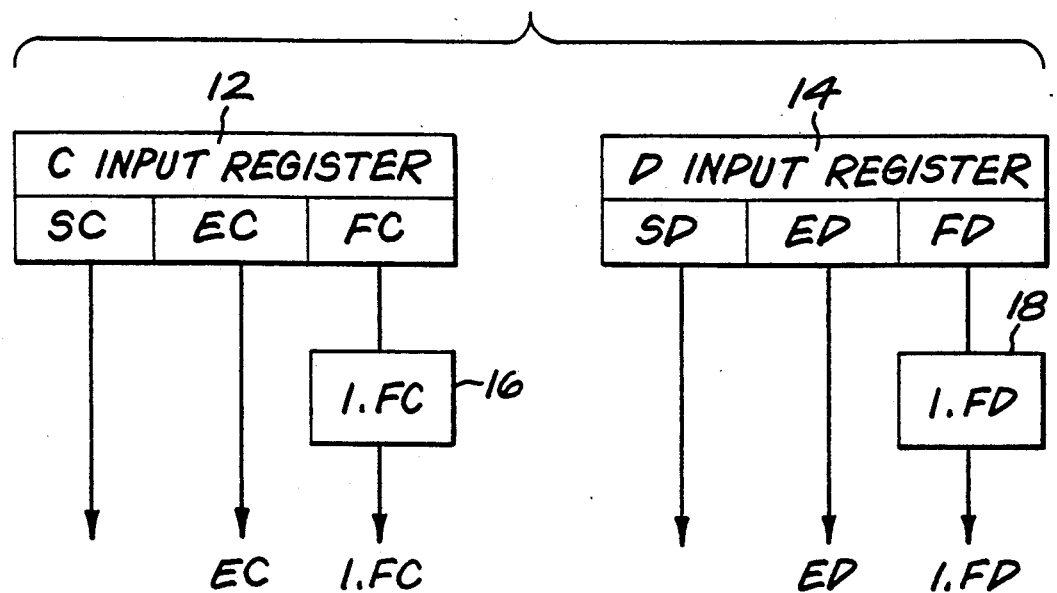
FIG. 2 is a block diagram illustrating a pair of input registers which receive and store a pair of signed magnitude floating point numbers to be added or subtracted.

FIG. 2 illustrates a C input register 12 with its associated sign, exponent and fractional fields SC, EC and FC, respectively, and a D input register 14 with its associated sign, exponent and fractional fields SD, ED and FD, respectively, for receiving the two signed magnitude floating point binary numbers C and D to be added or subtracted. Functional blocks 16 and 18 indicate that the assumed leading one bit is provided to the leftmost input field constituting the addition or subtraction operands. Thus, the fractional or mantissa portions of the floating point binary numbers C and D are represented by 1.FC and 1.FD, respectively. Also, the exponent parts of the floating point binary numbers C and D are represented by the values EC and ED, respectively.

Execution of a floating-point addition or subtraction operation is divided into the following sequence of events. First, the mantissa corresponding to the smaller exponent is denormalized according to the input exponents. Next, the addition of the mantissa data occurs and is followed by the post-normalization operation. The circuit contains two major sections for this purpose, the exponent data path and the mantissa data path. The denormalization and post-normalization steps both use the exponent data path and mantissa data path. The mantissa addition step occurs only in the mantissa data path. The function of each data path is described below. The input signals to the data paths are two signed magnitude numbers C and D. EC and ED represent the two exponent parts of C and D. 1.FC and 1.FD represent the mantissa parts (with implied one) of C and D. C and D each have an associated sign bit, SC and SD, respectively. The result of the floating point add/subtract operation is a resulting signed magnitude value S with a result exponent ES, a result mantissa 1.FS, and a result sign bit.

Figure 3:
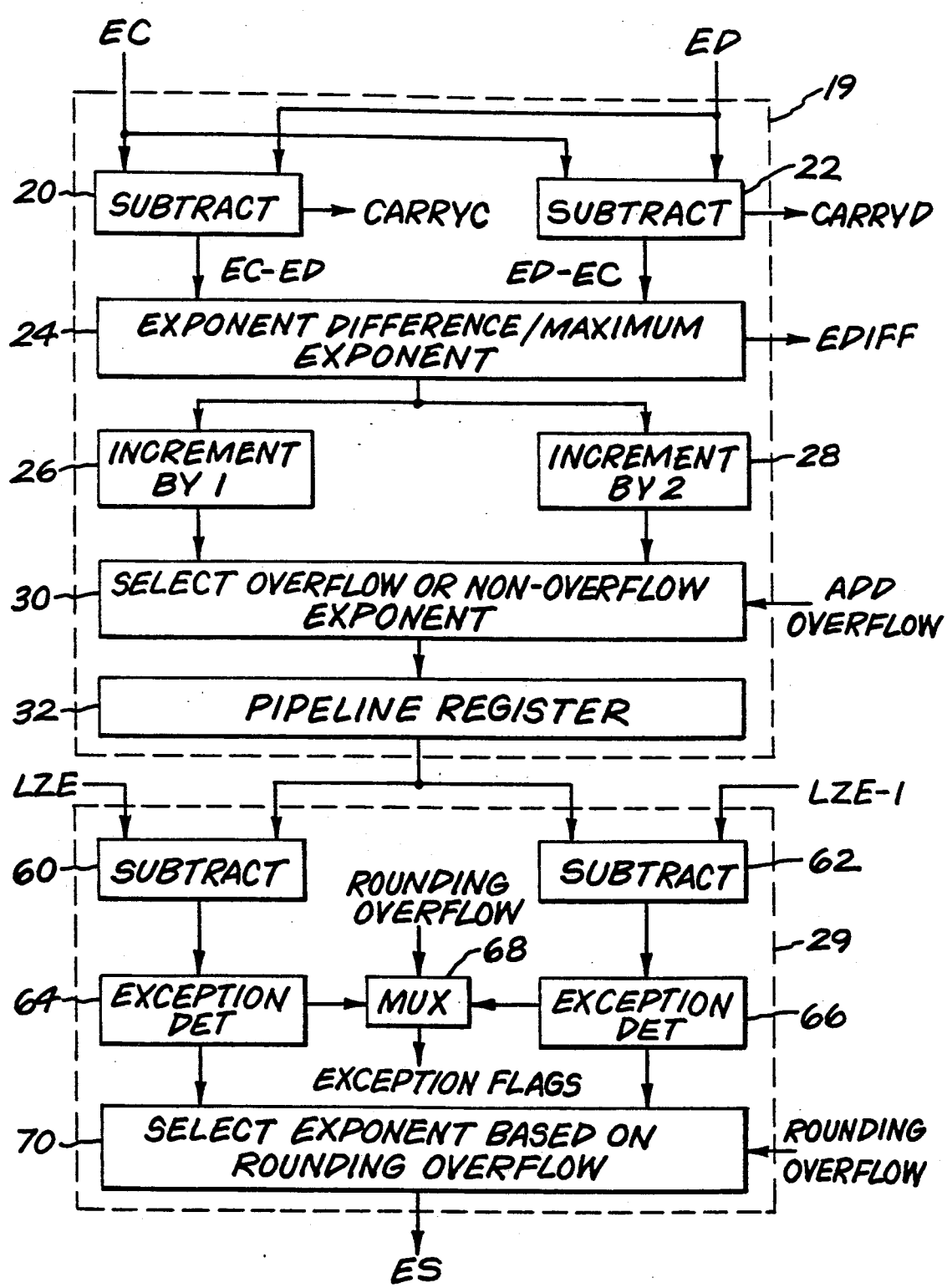
FIG. 3 is a block diagram of the exponent data path of an addition/subtraction system in accordance with the present invention.

The exponent data path performs three operations in computing a floating point addition or subtraction; first, it computes the absolute difference between the two input exponents; second, it passes the larger of the two input exponents; and third, it adjusts this larger exponent by the amount needed to normalize the resulting mantissa and adjusts the exponent, if desired, for any occurrence of an overflow or underflow. The exponent data path is shown in FIG. 3. In addition to the above functions, the exponent data path provides the capability of detecting result exponents that are out of the valid exponent range. The exponent data path is divided into two pipeline stages, which correspond to two pipeline stages in the mantissa data path.

In the first pipeline stage 19 of the exponent data path shown in FIG. 3, two subtract units 20 and 22 determine in parallel the exponent differences EC-ED and ED-EC. Each subtract unit produces a carry signal (CARRYC and CARRYD) which is used for controlling the mantissa subtraction operation. CARRYC is one if EC is greater than or equal to ED. CARRYD is one if ED is greater than or equal to EC. An exponent difference/maximum unit 24 selects the positive of the values EC-ED and ED-EC and sets an output signal EDIFF to this value. The difference/maximum unit 24 also selects the larger of the exponents EC and ED. This larger exponent value is incremented by both the values one and two by increment units 26 and 28, respectively.

An addition overflow signal from the mantissa data path is applied to a select unit 30 which selects the exponent incremented by two if an addition overflow occurs. It is necessary to increment the exponent by two since both addition overflow and rounding overflow may occur during an addition in the mantissa data path. (Rounding the fraction is the final step in the floating point addition and is performed by adding one least-significant bit to the fraction result. If the rounding operation does not cause a fraction overflow, the rounding result is the final fraction result. If the rounding operation does cause a fraction overflow, however, the exponent must be incremented by one—this is known as the "rounding overflow".) If both overflows do not occur, the result exponent is adjusted by subtracting one in the second pipeline stage. If no addition overflow occurs, select unit 30 selects the exponent incremented by one. The incremented exponent field selected by select unit 30 is then stored in the first stage pipeline register 32.

The mantissa data path performs the operations of denormalizing a first one of the input mantissas so that the exponents for both numbers are made identical to enable the other input mantissa to align with the mantissa of the first number, adding the two input mantissas after the denormalization operation, post-normalizing the mantissa from the result of the addition, and rounding the mantissa to the correct precision. The mantissa data path shown in FIG. 4 is divided into two pipeline stages 39 and 49, with a pipeline register 48 following the mantissa adder.

Figure 4:
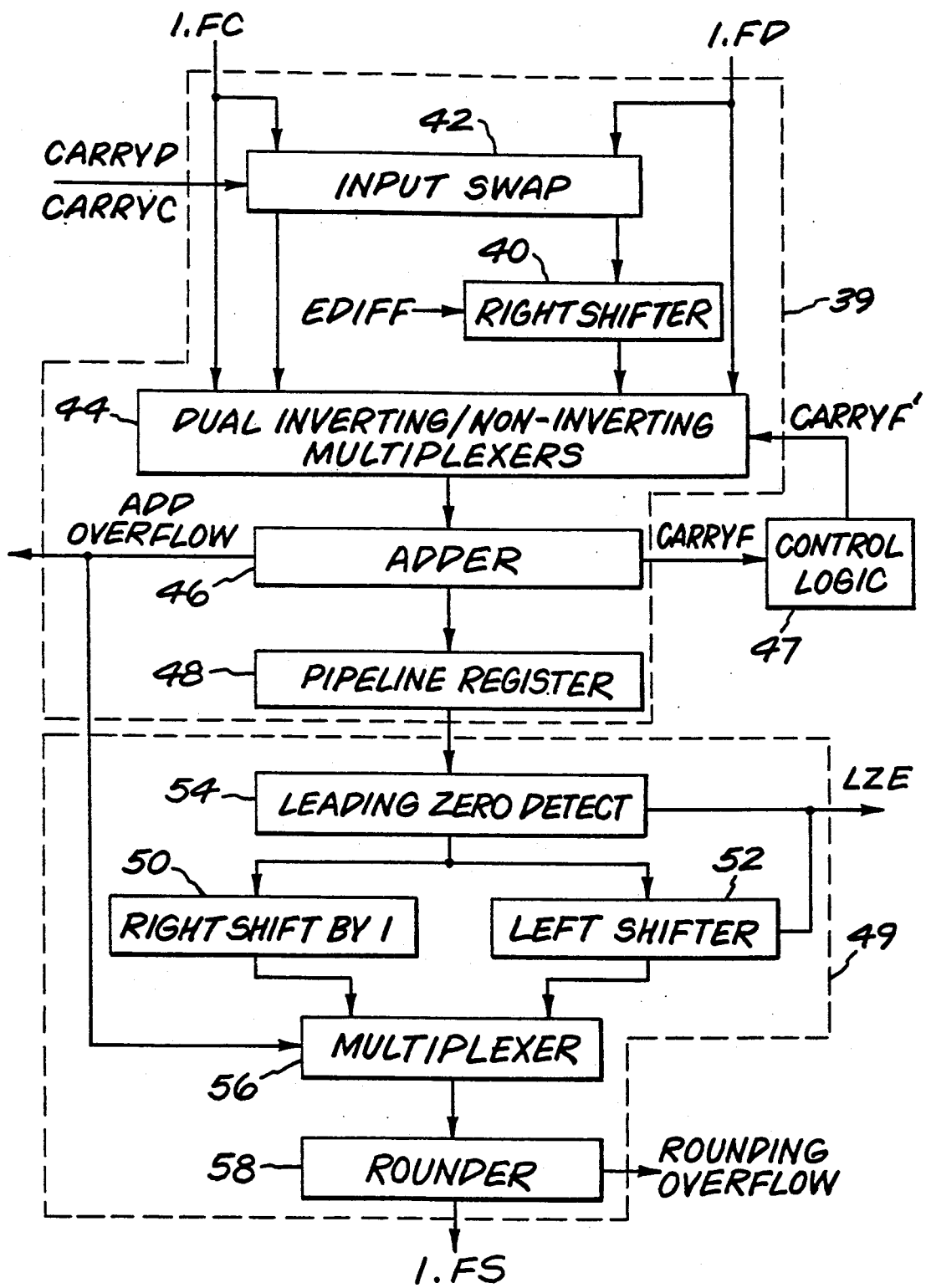
FIG. 4 is a block diagram of the mantissa data path of the addition/subtraction system in accordance with the present invention, showing control logic coupled thereto.

In the first pipeline stage 39 of the mantissa data path shown in FIG. 4, a right-shift cell 40 and a swap cell 42 are used to perform the denormalization of one of the input mantissas, after which both mantissas are now referred to as denormalized. The swap cell is typically a double multiplexer which presents one signal on a selected one of two output terminals and another signal on the other output terminal, or vice-versa, in response to its input conditions. The mantissa which is right-shifted is controlled by the CARRYD and CARRYC signals from the subtract cells 20 and 22 in the exponent data path shown in FIG. 3, and is shifted by the amount EDIFF computed by unit 24 in the exponent data path. The two denormalized mantissas are applied to dual inverting/noninverting multiplexers 44 and are added or subtracted in an adder 46. The result is stored in a second pipeline register 48. The sequence of events is such that the exponent difference is computed first in the exponent data path and the correct mantissa is right-shifted before the two denormalized mantissas are added/subtracted in the mantissa data path.

In order to perform a subtraction of the two signed magnitude mantissas to generate a signed magnitude result, it is necessary to determine which of the two mantissas is larger so that the smaller mantissa can be subtracted from the larger. This is accomplished by subdividing the operation of the first pipeline stage in half. During the first half subdivision of this pipeline stage operation, the exponent data path computes the exponent difference and the correct mantissa is denormalized. Adder 46 at this time is used to subtract mantissa 1.FD from mantissa 1.FC and the carry-out signal CARRYF from this subtraction determines which mantissa is larger when the exponent difference is zero. If the exponent difference is not zero, mantissa denormalization ensures that the subtract operation results in a signed magnitude result. During the second half subdivision of this pipeline stage operation, the addition/subtraction of the two denormalized mantissas occurs, and this result is stored in pipeline register 48.

In its second pipeline stage 49, the mantissa data path first post-normalizes the mantissa from the addition result stored in first pipeline stage 39 and then rounds the post-normalized result. During post-normalization, one of two actions may occur. If an addition overflow has occurred, as indicated by adder 46, the first pipeline stage mantissa result stored in pipeline register 48 is simply right-shifted one bit position by a right-shift cell 50 to post-normalize the mantissa. If there is no addition overflow, the mantissa stored in pipeline register 48 is left-shifted by a left-shift cell 52 by an amount equal to the number of leading zeros in the mantissa result stored in pipeline register 48. The number LZE of leading zeros is detected by a leading zero detect unit 54 and is sent to the exponent data path shown in FIG. 2 in order for that value to be subtracted from the exponent. Finally, the post-normalized mantissa is applied to a multiplexer 56 and is rounded, if necessary, by a rounder unit 58 to produce a result mantissa 1.FS. If the mantissa is rounded, rounder unit 58 produces a rounding overflow signal which is sent to the exponent data path shown in FIG. 2 to select the correct exponent value and the correct exception flags.

As explained above, in order to perform the subtraction and ensure that a signed magnitude result is generated, it is necessary to perform the subtraction of 1.FD–1.FC. This results in the signal CARRYF from mantissa adder 46 which is used by control logic 47 to determine which mantissa to subtract from the other if the exponent difference EDIFFF is zero. The control logic provides a signal CARRYF' to multiplexers 44 when EDIFF is zero, ensuring that the smaller mantissa is subtracted from the larger so that the result is in the signed magnitude format. The EDIFF signal need not be used if its value is zero, since CARRYC and CARRYD can be used to determine whether EC equals ED. When EC is equal to ED, both CARRYC and CARRYD are equal to one. Because the three carry signals CARRYC, CARRYD and CARRYF alone are not sufficient to determine which mantissa to subtract from the other and leave a signed magnitude result, three other signals are also used. These are the input sign values SC and SD of the two operands and the type of operation (add or subtract) being performed. These six signals determine completely which mantissa to subtract from which, leaving a signed magnitude result, and also determine the result sign of the operation being performed. Table 1 shows the conditions of the above signals that are used to determine the operation performed in mantissa adder 46 and the resulting sign of this operation. These conditions are used to control the dual inverting/noninverting multiplexers 44 in the mantissa data path in the second subdivision of the first pipeline stage. Inverting the correct mantissa allows a subtraction to result in a signed magnitude format. In the first subdivision of the first pipeline stage 39, the dual inverting/noninverting multiplexers 44 are used to set up the mantissa so that the operation 1.FC–1.FD is performed. In Table 1, the input C sign and the input D sign represent the sign fields SC and SD, respectively, of FIG. 2. (The symbol "X" in any column means that the result of the operation identified in that column is not used for the specified condition.)

exponent stored in the first pipeline register 32. Exceptions for each result are then detected by exception detectors 64 and 66 and the correct exception flags and exponent result ES are selected by a multiplexer 68 and a select exponent unit 70, respectively, both of which respond to the rounding overflow signal from rounder unit 58 which performs the mantissa rounding operation in the mantissa data path shown in FIG. 4. Exception detectors 64 and 66 are used to generate two sets of possible exception flags, one set each for the possible exponent results. When the rounding overflow signal selects one of the two exponent results, it also selects the corresponding exception flags. The exception flags are values indicating whether floating point exceptions have occurred during the floating point addition or subtraction operation. The possible floating point exceptions for addition and subtraction are floating point overflow and floating point underflow. These occur when the result of the addition or subtraction operation is greater or less than the representable value in the specified floating point format. In order to determine this, the number of bits in the exponent data path is two greater than the actual number of bits in the exponent data format. For example, with 2048 possible values for the expected exponent, the exception detectors detect, as floating point exceptions, presence of any negative number and of any positive number greater than 2048.

In the timing diagram of FIG. 5, two sets of clock pulses designated "clock 1" and "clock 2", used for clocking data through the two pipeline stages of FIGS. 3 and 4, are seen to be phase-shifted with respect to each other so as to leave an interval between any two successive clock pulses in which both clocks are low. As evident from the conditions for the first and second pipeline stages, designated "pipeline 1" and "pipeline 2" at "add 1 start", the exponent differences EC-ED and ED-EC are supplied to subtract units 20 and 22 in the first pipeline stage 19 of the system of FIG. 3, and the first half of the first pipeline stage processes the data as previously described, followed by the further processing performed by the second half of the first pipeline stage. At the time designated "add 2 start", the second

TABLE 1

Conditions For Determining Operation To Be Performed And Resulting Sign In Mantissa Data Path

| Input Oper. | Input C Sign | Input D Sign | EC - ED CARRYC | ED - EC CARRYD | 1.FC - 1.FD CARRYF | Operation Performed | Sign Of Result |
| --- | --- | --- | --- | --- | --- | --- | --- |
| + | + | + | X | X | X | C + D | + |
| + | − | − | X | X | X | C + D | − |
| − | + | − | X | X | X | C + D | + |
| − | − | + | X | X | X | C + D | − |
| + | + | − | 1 | 0 | X | C − D | + |
| + | + | − | 0 | 1 | X | D − C | − |
| + | + | − | 1 | 1 | 1 | C − D | + |
| + | + | − | 1 | 1 | 0 | D − C | − |
| − | + | + | 1 | 0 | X | C − D | + |
| − | + | + | 0 | 1 | X | D − C | − |
| − | + | + | 1 | 1 | 1 | C − D | + |
| − | + | + | 1 | 1 | 0 | D − C | − |
| + | − | + | 1 | 0 | X | C − D | − |
| + | − | + | 0 | 1 | X | D − C | + |
| + | − | + | 1 | 1 | 1 | C − D | − |
| + | − | + | 1 | 1 | 0 | D − C | + |
| − | − | − | 1 | 0 | X | C − D | − |
| − | − | − | 0 | 1 | X | D − C | + |
| − | − | − | 1 | 1 | 1 | C − D | − |
| − | − | − | 1 | 1 | 0 | D − C | + |

In the second pipeline stage 29 of the exponent data path shown in FIG. 3, two subtract units 60 and 62, in parallel, subtract the values LZE and LZE-1 from the pipeline stage 49 begins operation by post-normalizing the mantissa from the addition result stored in first pipeline stage 39 and processes the data as previously described. At the same time, the first pipeline stage receives new values of EC-ED and ED-EC for processing. When the second pipeline stage 29 produces its exponent result ES at the time designated "result 1 finish", the first signed magnitude floating point addition or subtraction is complete and the second pipeline stage 49 begins to post-normalize the mantissa from the new addition result stored in first pipeline stage 39. When the second pipeline stage 29 produces its second exponent result ES at the time designated "/result 2 finish", the second signed magnitude floating point addition or subtraction is complete and again the second pipeline stage 49 begins to post-normalize the mantissa from the third addition result stored in first pipeline stage 39. These operations are thus repeatedly performed by the system.

The preadjustment in the first pipeline stage 19 and subsequent correction in the second pipeline stage 29 is performed since it is trivial to incorporate a subtract-by-one into the subtraction of the LZE value, while an increment-by-one would require that this incrementing be performed after the LZE subtraction and would be much slower. Thus by performing these operations in parallel, the exponent adjustment computations are completed faster with parallel hardware, using the overflow signals to simply select the correctly adjusted exponent value.

A double precision floating point adder/subtractor was implemented in a floating point coprocessor design. The mantissa data path was implemented as described above for double precision floating point data. The exponent data path was implemented as described above with modifications for floating point multiplication as well as addition.

The foregoing describes a versatile floating point adder which efficiently performs the operations of both addition and subtraction. This floating point adder is a general purpose adder not dependent on the precision of the computation. Silicon compilers can take advantage of the modularity of this design to reconfigure architectures with the precision required for various applications.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is as follows:

1. A system for adding or subtracting a pair of signed magnitude floating point binary numbers, each of said numbers including a sign field, a mantissa field, and an exponent field, said system comprising:

an exponent data path for selecting the larger of said exponent fields and for incrementing the larger of said exponent fields by one and by two;

a mantissa data path for determining the sum or difference of said mantissa fields and for determining an addition overflow and a rounding overflow to provide a result mantissa, said mantissa data path including means for determining the number of leading zeros LZE in the sum or difference of the mantissa fields;

first selecting means in said exponent data path for selecting the exponent field incremented by one if no addition overflow occurs and for selecting the exponent field incremented by two if an addition overflow occurs; and second selecting means in said exponent data path for selecting the value of the incremented exponent field less the number of leading zeros LZE if no rounding overflow occurs and for selecting the value of the incremented exponent field less LZE-1 if a rounding overflow occurs, to provide a result exponent.

2. The system of claim 1 wherein said exponent data path includes:

a pipeline register for storing the incremental exponent field selected by said first selecting means; and means for subtracting the values LZE and LZE-1 from the incremented exponent field stored in said pipeline register.

3. The system of claim 2 wherein said mantissa data path includes:

means for rounding the sum or difference of the mantissa fields if necessary to provide the result mantissa and for indicating a rounding overflow if the sum or difference of the mantissa fields is rounded.

4. The system of claim 1 wherein said mantissa data path includes:

a pipeline register for storing the sum or difference of said mantissa fields;

means for shifting in one direction the sum or difference of the mantissa fields stored in said pipeline register by one if an addition overflow occurs; and means for shifting in an opposite direction the sum or difference of the mantissa fields stored in said pipeline register by the amount LZE if no addition overflow occurs.

5. The system of claim 4 wherein said one direction is to the right and said opposite direction is to the left.

6. The system of claim 4, wherein:

said exponent data path includes means for determining the positive difference between the exponent fields; and said mantissa data path includes means for shifting one of said mantissa fields in one direction by the amount of the positive difference between said exponent fields prior to determination of the sum or difference of said mantissa fields.

7. The system of claim 6 wherein said one direction is to the right.

8. A system for adding or subtracting a pair of floating point binary numbers, each of said floating point numbers including a sign field and a mantissa field which express a signed magnitude, each of said floating point numbers further including an exponent field, said system comprising:

means responsive to the exponent fields of said pair of floating point binary numbers for selecting the larger of said exponent fields;

means responsive to the mantissa fields of said pair of floating point binary numbers for determining the sum of, or the difference between, said mantissa fields, and for determining an addition overflow;

means for incrementing the larger of the exponent fields by one and by two;

means for selecting the exponent field incremented by one if no addition overflow occurs and for selecting the exponent field incremented by two if an addition overflow occurs;

first and second pipeline registers for storing the selected exponent field and the sum of, or the difference between, the mantissa fields;

means for right-shifting by one the sum of, or the difference between, the mantissa fields stored in said second pipeline register if an addition overflow occurs;

means for determining the number LZE of leading zeros in the sum of, or the difference between, the mantissa fields stored in said second pipeline register;

means for left-shifting by the amount LZE the sum of, or the difference between, the mantissa fields stored in said second pipeline register if no addition overflow occurs;

means for subtracting the values LZE and LZE-1 from the selected exponent field stored in said first pipeline register;

means for rounding the right-shifted or left-shifted sum of, or difference between, the mantissa fields if necessary to provide a result mantissa, and for indicating a rounding overflow if the sum or difference is rounded; and means for selecting the value of the exponent field less LZE if no rounding overflow occurs and for selecting the value of the exponent field less LZE-1 if a rounding overflow occurs, to provide a result exponent.

9. The system of claim 8, further including:

means for determining the positive difference between said exponent fields; and means for right-shifting one of said mantissa fields, if necessary, by the amount of the positive difference between said exponent fields prior to determination of the sum of, or difference between, said mantissa fields.

10. A system for subtracting a pair of signed magnitude floating point binary numbers, each of said numbers including a sign field, a mantissa field, and an exponent field, said system comprising:

an exponent data path for selecting the larger of said exponent fields and for incrementing the larger of said exponent fields by one and by two;

means for subtracting one of said mantissa fields from the other and producing a carry-out signal; and control logic for storing said carry-out signal and providing, to said subtracting means, an indication of zero difference in said exponent fields so that the smaller of said mantissa field is subtracted from the larger to produce a mantissa result in the signed magnitude format.

11. A system for subtracting a pair of signed magnitude floating point binary numbers, each of said numbers including a sign field, a mantissa field, and an exponent field, said system comprising:

an exponent data path for selecting the larger of said exponent fields and for incrementing the larger of said exponent fields by one and by two;

means for subtracting one of said mantissa fields from the other and producing a carry-out signal;

control logic for storing said carry-out signal and providing, to said subtracting means, an indication of zero difference in said exponent fields so that the smaller of said mantissa field is subtracted from the larger to produce a mantissa result in the signed magnitude format;

first selecting means in said exponent data path for selecting the exponent field incremented by one if no addition overflow occurs and for selecting the exponent field incremented by two if an addition overflow occurs; and second selecting means in said exponent data path for selecting the value of the incremented exponent field less the number of leading zeros LZE in the difference of the mantissa fields if no rounding overflow occurs and for selecting the value of the incremented exponent field less LZE-1 if a rounding overflow occurs, to provide a result exponent.

* * * * *